Oct. 23, 1923.
H. A. SUTTON ET AL
1,471,366
CANNON TUNNEL MOUNT
Filed March 29, 1923
2 Sheets-Sheet 1
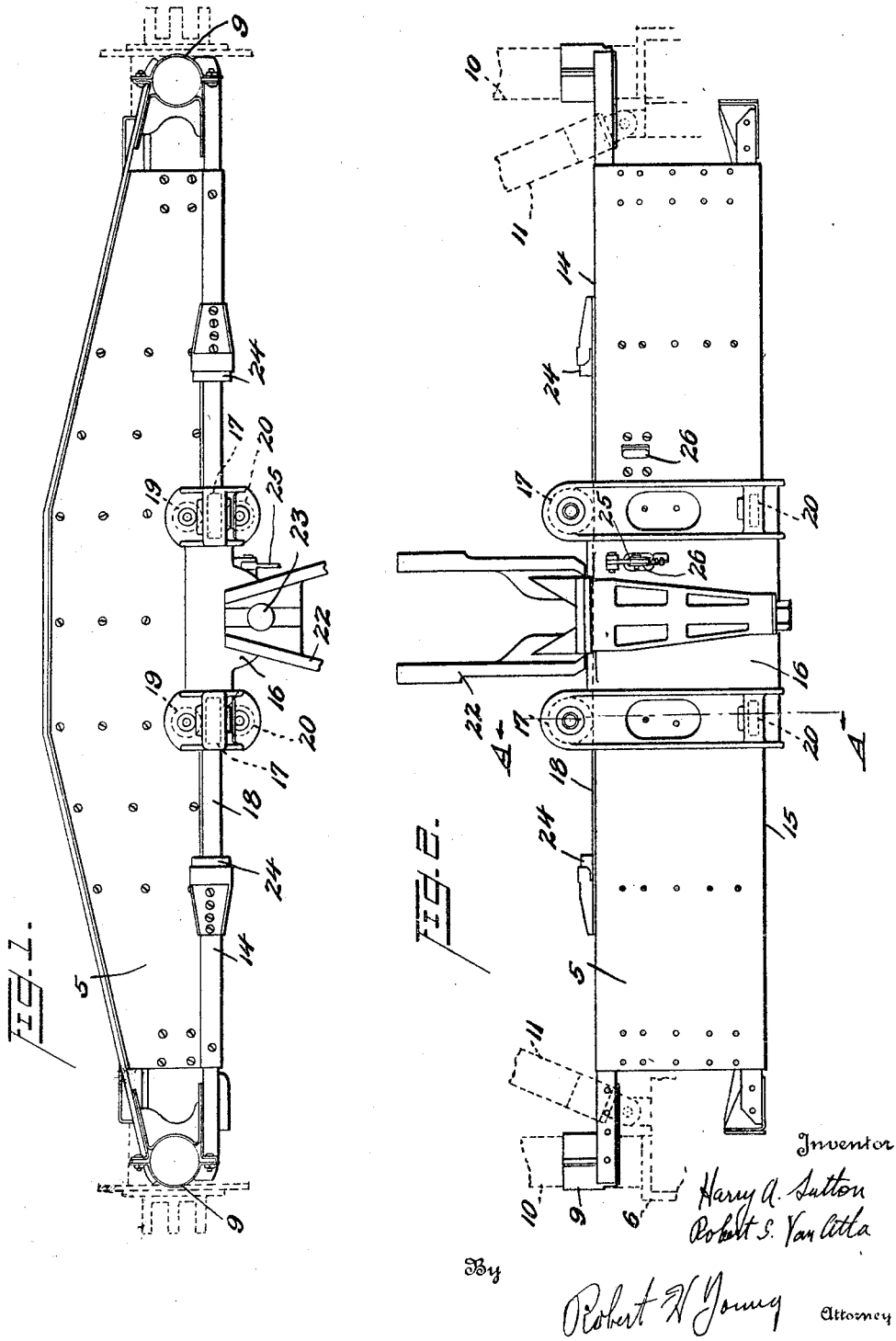
Inventor
Harry A. Sutton
Robert S. Van Atta
By
Robert H. Young  Attorney Oct. 23, 1923.

H. A. SUTTON ET AL 1,471,366

CANNON TUNNEL MOUNT

Filed March 29, 1923     2 Sheets-Sheet 2

Inventor
Harry A. Sutton
Robert S. Van Atta

By Robert H. Young   Attorney

Patented Oct. 23, 1923.

1,471,366

UNITED STATES PATENT OFFICE.

HARRY A. SUTTON AND ROBERT S. VAN ATTA, OF DAYTON, OHIO.

CANNON TUNNEL MOUNT.

Application filed March 29, 1923. Serial No. 628,659.

*To all whom it may concern:*

Be it known that we, HARRY A. SUTTON and ROBERT S. VAN ATTA, citizens of the United States, residing at Dayton, Ohio, in the county of Montgomery and State of Ohio, have invented certain new and useful Improvements in Cannon Tunnel Mounts, of which the following is a specification.

This invention relates to cannon or gun mounts for installation in or adjacent to the tunnels formed in the underside of the fuselages or bodies of aircraft and particularly airplanes or aerial bombers used in time of war.

The main object of the invention is to provide a mount which will enable the gun carriage to be quickly shifted laterally of aircraft body or fuselage to permit a greater field of fire from a narrow fuselage than could be obtained were the trunnion yoke held stationary.

With the above and other objects in view the invention consists in the novel construction, combination and arrangement herein fully described, shown and claimed.

In the accompanying drawings—

Figure 1 is a top plan view of the gun mount, omitting the gun;

Figure 2 is a rear elevation of the same;

Figure 3:
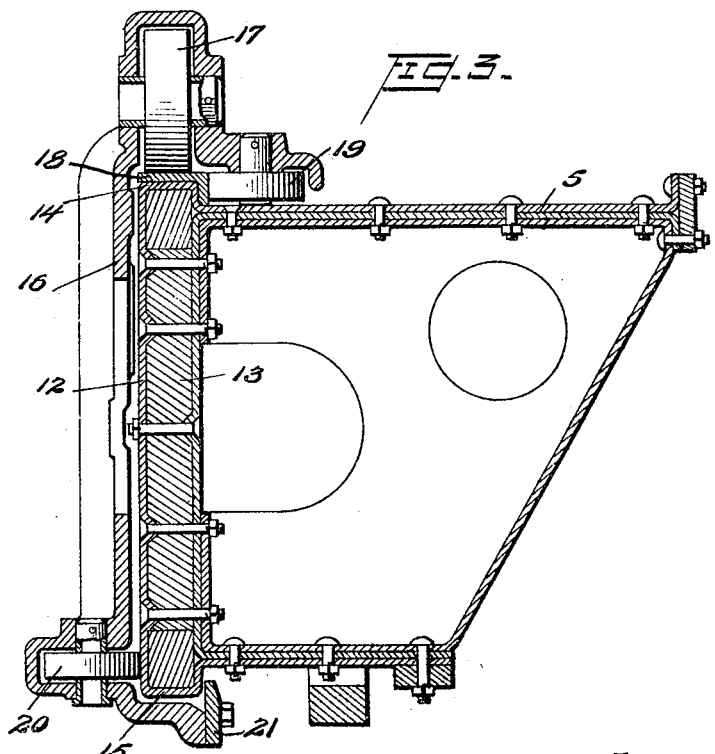
Figure 3 is a vertical cross section on the line A—A of Figure 2.
Figure 4:
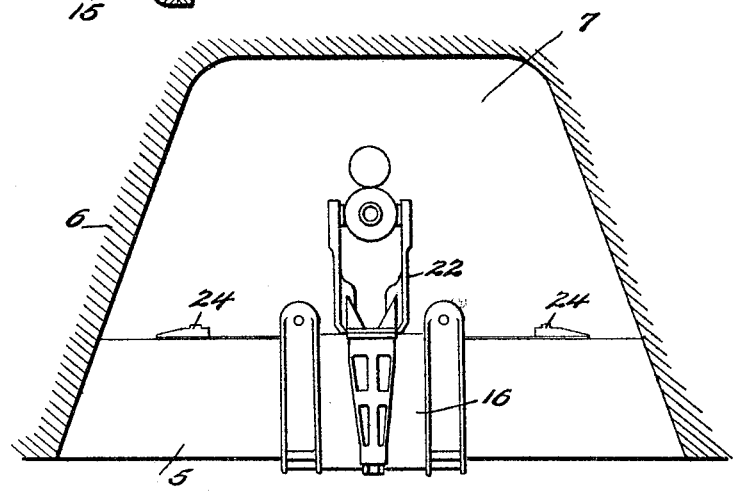
Figure 4 is a rear elevation, on a reduced scale, of the mount applied to a fuselage.

The improved mount comprises as one of the principal elements thereof a main supporting beam 5. which, when the aircraft is flying on an even or level keel, so to speak, extends horizontally across the longitudinal axis of the body or fuselage 6 of the craft. The fuselage is formed in the underside thereof with a tunnel 7 which extends rearwardly from a bulkhead 8. The beam 5 adjoins such bulkhead and is provided with end socket members or clevises 9 to receive and firmly clamp supporting standards 10 fastened in the fuselage. The beam 5 may be strengthened by inclined upwardly converging braces 11 connecting the beam with an overhead frame member of the fuselage.

The beam 5, as shown in Figure 3, is preferably formed of sheet metal sections suitably shaped and united as shown to provide a structure of hollow formation and trapezoidal in cross section. To cushion and deaden vibration, the vertical wall 12 of this beam, this being the wall next to the gun carriage, is made hollow and suitable shock absorbing filler 13 is placed therein and anchored as shown. The beam 5 is also formed with top and bottom track-forming flanges 14 and 15, respectively, for guiding a gun carriage 16 movable lengthwise of the beam and transversely of the fuselage tunnel. The carriage embodies rollers 17 which rest and roll on a shoe 18 fast on the top of the flange 14, upper lateral rollers 19 which work in contact with the forward face of the shoe 18, and lower lateral rollers 20 which bear and roll against the rear side of the bottom flange 15 of the beam. The rollers 17, 19 and 20 reduce friction between the carriage and its supporting beam and take the recoil during the firing of the gun. The carriage also comprises a detachable strip like section 21 which forms a retaining flange to prevent dislocation of the carriage from the beam. By removing the flange 21, the carriage may be demounted, and with it the gun trunnion yoke 22 journaled in the carriage as at 23.

The movement of the gun carriage is limited in opposite directions by adjustable stops or cushioned bumpers 24 and may be locked at different stations by means of a latch 25 insertable in any one of several sockets 26 in the beam 5, as shown in Figure 2. The carriage may thus be shifted along its supporting beam across the tunnel of the fuselage and locked at any station desired. The gun fires rearwardly along the tunnel, the gunner facing toward the rear end of the fuselage. The mount affords a much greater lateral range of firing than the ordinary mount where the gun trunnion yoke is not capable of being shifted laterally.

We claim—

1. A cannon tunnel mount for aircraft embodying a gun-supporting beam adapted to be placed in a normally horizontal position across the tunnel of an aircraft fuselage, and a gun carriage movable longitudinally of said beam.

2. A cannon tunnel mount for aircraft embodying a gun-supporting beam adapted to be placed in a normally horizontal position across the tunnel of an aircraft fuselage, and having top and bottom flanges extending lengthwise thereof, and a gun carriage engaging said flanges and movable lengthwise of said beam.

3. A cannon tunnel mount for aircraft embodying a gun-supporting beam adapted to be placed in a normally horizontal position across the tunnel of an aircraft fuselage, and having parallel track-forming flanges in spaced relation to each other, and a gun carriage movable in engagement with said flanges.

4. A cannon tunnel mount for aircraft embodying a gun-supporting beam adapted to be placed in a normally horizontal position across the tunnel of an aircraft fuselage, a gun carriage movable longitudinally of said beam, and embodying means for retaining the same in engagement with the beam.

5. A cannon tunnel mount for aircraft embodying a gun-supporting beam adapted to be placed in a normally horizontal position across the tunnel of an aircraft fuselage, a gun carriage movable longitudinally of said beam, and carriage-retaining means for preventing displacement of the carriage from the beam while in action but permitting the carriage to be mounted from the beam.

6. A cannon tunnel mount for aircraft embodying a gun-supporting beam adapted to be placed in a normally horizontal position across the tunnel of an aircraft fuselage, a gun carriage movable longitudinally of said beam, and having antifriction recoil-sustaining rollers in engagement with the beam.

7. A cannon tunnel mount for aircraft embodying a gun-supporting beam adapted to be placed in a normally horizontal position across the tunnel of an aircraft fuselage, and a gun carriage movable longitudinally of said beam, the beam having means to limit the movements of the carriage.

8. A cannon tunnel mount for aircraft embodying a gun-supporting beam adapted to be placed in a normally horizontal position across the tunnel of an aircraft fuselage, a gun carriage movable longitudinally of said beam, and means for locking said carriage at different stations along the beam.

9. A cannon tunnel mount for aircraft embodying a gun-supporting beam adapted to be placed in a normally horizontal position across the tunnel of an aircraft fuselage, a gun carriage movable longitudinally of said beam and comprising a gun yoke journaled in the carriage.

In testimony whereof we affix our signatures.

HARRY A. SUTTON.
ROBERT S. VAN ATTA.